Nov. 10, 1931.  W. H. RADFORD  1,831,194
TRANSMISSION
Filed Oct. 8, 1928  3 Sheets-Sheet 2
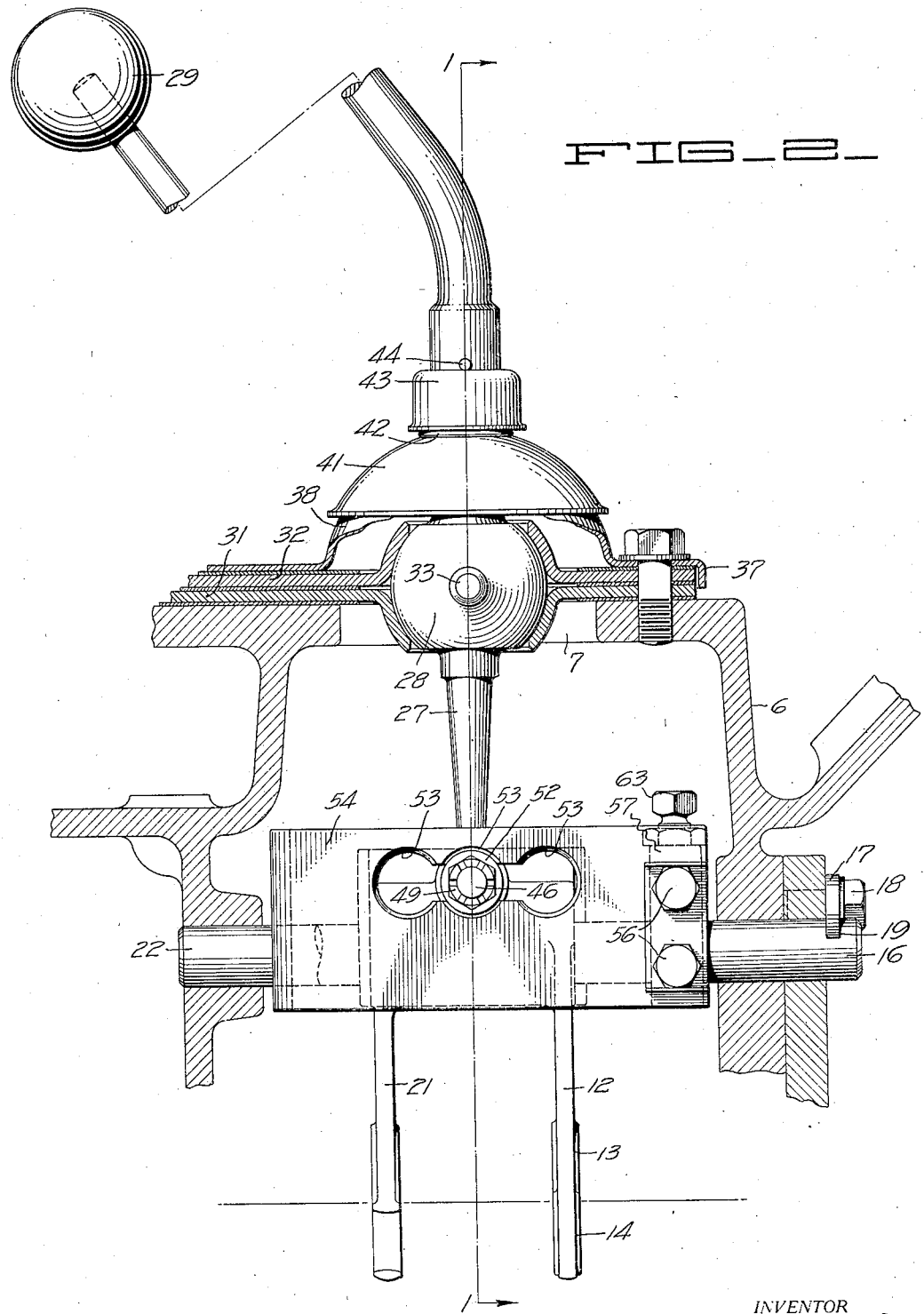
FIG_2_
INVENTOR
William H. Radford
BY
White, Prost Fryer
ATTORNEYS Nov. 10, 1931.  W. H. RADFORD  1,831,194
TRANSMISSION
Filed Oct. 8, 1928  3 Sheets-Sheet 3
FIG_3_
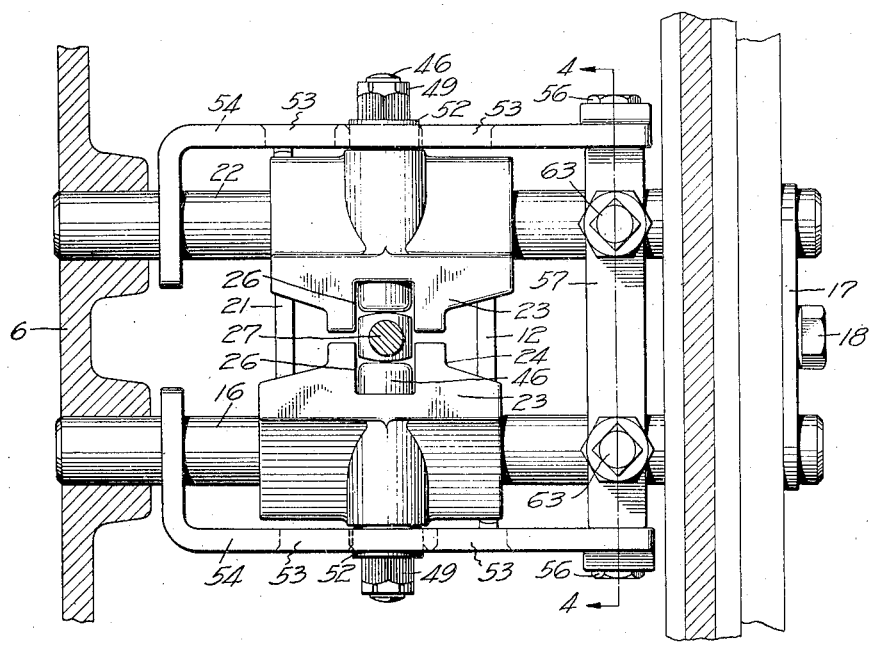
FIG_4_
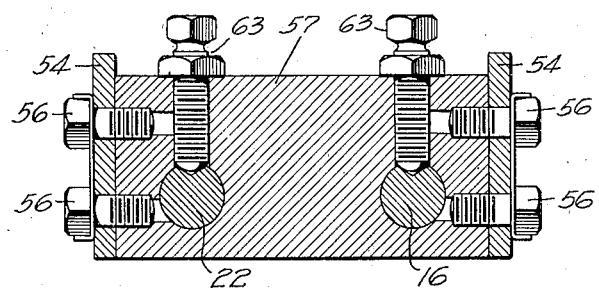
INVENTOR
William H. Radford
BY
White, Prost & Fryer
ATTORNEYS Patented Nov. 10, 1931

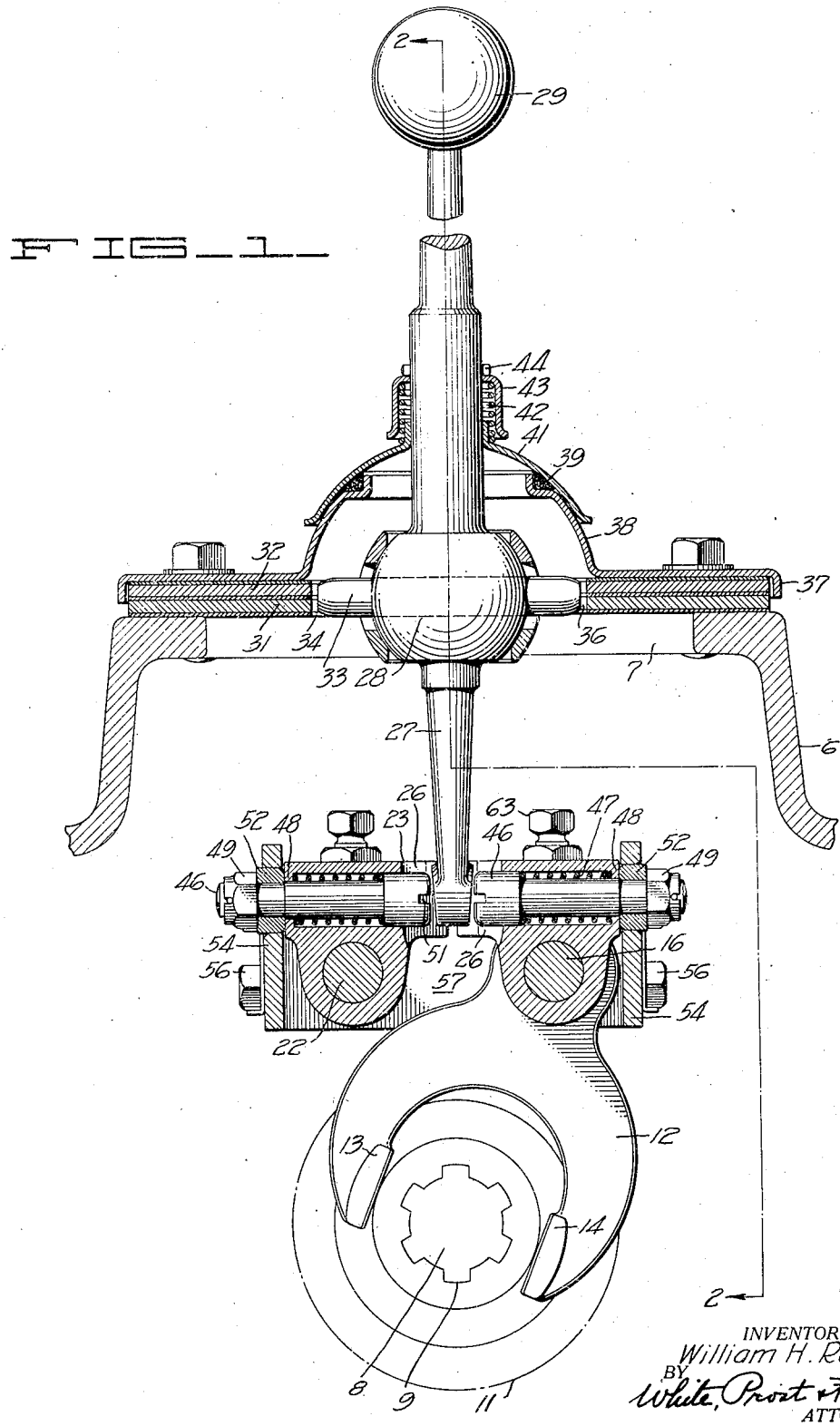

1,831,194

UNITED STATES PATENT OFFICE

WILLIAM H. RADFORD, OF SAN LEANDRO, CALIFORNIA, ASSIGNOR TO CATERPILLAR TRACTOR CO., OF SAN LEANDRO, CALIFORNIA, A CORPORATION OF CALIFORNIA

TRANSMISSION

Application filed October 8, 1928. Serial No. 310,964.

My invention relates to transmission mechanism particularly applicable for use in automotive vehicles such as tractors and is especially concerned with sliding gear transmissions having a selective shifting mechanism.

An object of my invention is to provide means for positively locking the gears in any selected position of engagement.

Another object of my invention is to provide a simple means for shifting the gears from one locked position to another locked position.

An additional object of my invention is to provide a shifting mechanism in which a single shift lever can be utilized to operate a locking or latching mechanism as well as to effect shifting of the gears.

The foregoing and other objects are attained in the embodiment of the invention shown in the drawings, in which Fig. 1 is a cross section transversely thru the central portion of a transmission built in accordance with my invention, the plane of section being indicated by line 1—1 of Fig. 2.

Fig. 2 is a cross section longitudinally of the transmission, as indicated in Fig. 1, by line 2—2, certain portions being shown in elevation.

Fig. 3 is a plan of the shifting forks and their associated parts.

Fig. 4 is a cross section on the line 4—4 of Fig. 3.

In its preferred form, the transmission of my invention comprises a movable member shiftable with respect to a stationary member combined with latching means for locking the relatively movable member in shifted position and operated by a shifting lever which initially disengages the locking mechanism and shifts the relatively movable parts.

In the form of the invention shown in the drawings, there is provided a transmission case 6 of the usual kind having an opening 7 in the upper portion thereof. Passing longitudinally thru the transmission case is a gear shaft 8 formed with splines 9 on which a gear 11 is slidable. To effect sliding movement of the gear there is afforded a shifting fork 12 having jaws 13 and 14 in engagement with the gear and mounted on a shaft 16 fixed in the transmission case 6. The shaft 16 is held to the case by a strap 17 secured by a stud 18 and in engagement with a groove 19 cut in the shaft 16. As is customary, there is also provided a second shifting fork 21 in all respects similar to the fork 12 for shifting a second gear on shaft 8 (not shown), and likewise mounted on a shaft 22 held stationary in the case 6 by the same holding mechanism. The two shafts 16 and 22 are preferably equi-distant from the axis of shaft 8 and the shifting forks 12 and 21 are made in almost exact likeness and are reversely arranged on their respective shafts.

To effect selective shifting movement of either of the forks 12 or 21 in accordance with the usual practice, I provide on each fork a projection 23 which is cut away at each end, as shown at 24, and is formed with a depression 26 adjacent the central portion thereof. In the neutral position of the transmission, the two shifting forks are usually arranged as disclosed in Fig. 3 with the two depressions 26 in alinement. Projecting into the alined depression is the lower end of a shifting lever 27 of the customary kind having intermediate its ends a spherical portion 28 and projecting a considerable distance from the case 6 to a ball 29 for convenient manual operation. The portion 28 is encompassed by a spheroidal shield provided by two plates 31 and 32 usually of pressed metal. These two sheets are similar in contour and are placed in reverse symmetry to provide a seat for the shift lever. The plates preferably are sufficient in extent to afford a closure for the opening 7. Axial rotation of the shift lever 27 is precluded by a pin 33 piercing the spherical portion 28 and loosely fitting slots 34 and 36 cut out of the plates 31 and 32.

An additional closure for the transmission case 6 is gained by the use of a cover plate 37 having a central hemi-spheroidal portion 38 contoured to form a seat for a packing washer 39. A cooperating cover 41 is placed around the lever 27 and is slidable thereon within narrow limits. The cover is pressed into place by a spring 42 shielded by a cup 43 which in turn is retained by a pin 44 passing thru the shift lever 27.

The described construction is such that the shift lever may be manually moved transversely and longitudinally about the center of the spheroidal portion 28 in order that its lower depending end may enter either depression 26 to slide either fork axially along shaft 16 or shaft 22, as the case may be.

To guard against accidental dislodgement of the gears from any selected shifted position, I provide a latching means. Each of the shifting forks 12 and 21 is transversely apertured to provide a cylindrical housing for a plunger 46. The plunger is reduced in diameter to accommodate a coil spring 47 bearing against the head of the plunger and against an inturned flange 48 on the shifting fork. The plunger is retained in place by a nut 49 screwed and locked on the extended end thereof, and relative rotation of the parts may be effected by means of a screw driver slot 51 on the inner end of the plunger.

Surrounding the plunger 46 is a collar 52 adapted to enter any selected one of three apertures 53 formed in a bracket 54 supported by the shaft 16. It will be noted that the bracket has a curved end which is pierced to rest on the shaft 16 and at its opposite extremity is likewise pierced to receive studs 56 for securing it to a block 57 held in place on the shafts 16 and 22 by studs and lock nuts 63. The apertures 53 are spaced to correspond to gear positions such as intermediate, neutral and high of the conventional transmission and their common walls are cut away sufficiently to allow passage of the reduced portion of the plunger 46. When the plunger is pressed under the influence of spring 47, the collar 52 enters its respective aperture 53 in the bracket 54 and prevents any longitudinal movement of the shifting fork 12 and thereby locks the gears in mesh and the shifting mechanism in shifted position. An entirely similar arrangement is provided on each of the shafts 16 and 22 so that all of the positions of the transmission are provided with means for locking the gears in mesh.

In the operation of the device, the lateral movement of the shifting lever 27 from neutral position initially depresses the plunger 46 thereby removing the collar 52 from its cooperating aperture in the bracket 54. Thus there is permitted a subsequent longitudinal movement of the shift lever and of the particular shifting fork 12 or 21 which is engaged thereby. When the longitudinal shift has been completed, release of the shift lever permits the spring-thrust plunger to urge the shift lever 27 against the opposite face of the other shifting fork and permits the collar 52 to seat in the adjacent aperture 53 and so locks the forks and gears in shifted position. This manner of shifting is applicable to any one of the positions of the gears in the transmission so that for any elected speed, the proper meshing of the gears is assured and is maintained.

It is to be understood that I do not limit myself to the form of the transmission shown and described herein, as the invention, as set forth in the following claims may be embodied in a plurality of forms.

I claim:

1. In a transmission, an apertured stationary member, a shifting fork slidable with respect to said member, a plunger on said fork maintained in said apertured member during movement of said fork, and a shifting lever adapted to abut the other end of said plunger for releasing said latch and sliding said fork.

2. In a transmission, a stationary member having apertures therein connected by a slot, a shiftable member, a plunger mounted on said shiftable member and adapted to pass through said slot, a collar on one end of said plunger, means for urging said collar to seat within said apertures, a shifting member, and a head on said plunger adapted to be engaged upon the initial movement of said shifting member for releasing said collar from said apertures.

3. In a transmission, a shifting means and a lock therefor, comprising a stationary element having a relieved portion and an element cooperatively associated with said shifting means and movable in various directions in said stationary relieved portion of said element to lock said shifting means.

4. In a transmission, locking means, including a member having a plurality of interconnected apertures and a member movable with respect to said first member and cooperating with said apertures.

5. In a transmission, a member having communicating apertures therein, a shiftable member having a plunger adapted to pass through said apertures, a head on said plunger and means to urge said head into said apertures.

6. In a transmission, shift means, a stationary element having a slotted portion provided with locking positions, and an element maintained in position within said slotted portion and adapted to be moved relative to said slotted portion to a selected locking position by said shift means.

7. In a transmission, shift means, a stationary element provided with a series of interconnected apertures and a movable element moved by said shift means to one of said apertures and means for maintaining said movable element in engagement with said element providing said series of interconnected apertures.

In testimony whereof, I have hereunto set my hand.

WILLIAM H. RADFORD.

CERTIFICATE OF CORRECTION.

Patent No. 1,831,194.                        Granted November 10, 1931, to

WILLIAM H. RADFORD.

It is hereby certified that Certificate of Correction issued February 9, 1932, was erroneously drawn as to the word "stationary" and that this Certificate should have read as follows: Page 2, line 100, claim 3, strike out the word "stationary" and insert the same before the word "element" in line 101; and that the said Certificate may conform to the records of the office.

Signed and sealed this 3rd day of May, A. D. 1932.

(Seal)

M. J. Moore,
Acting Commissioner of Patents.